Jan. 28, 1964     D. E. KENYON     3,119,960
ELECTROMAGNETIC MARINE SPEEDOMETER MOUNTED SUBSTANTIALLY
FLUSH WITH AN OUTER SURFACE OF A SHIP
Filed May 10, 1960

INVENTOR.
DAVID E. KENYON
BY
*George L. Black*
AGENT

United States Patent Office 3,119,960
Patented Jan. 28, 1964

3,119,960
ELECTROMAGNETIC MARINE SPEEDOMETER MOUNTED SUBSTANTIALLY FLUSH WITH AN OUTER SURFACE OF A SHIP
David E. Kenyon, 12 Montfort Drive, Huntington, N.Y.
Filed May 10, 1960, Ser. No. 28,092
5 Claims. (Cl. 324—70)

The present invention relates to devices for determining the speed of a vessel travelling through water.

In one device known in the art, a strut mounted on compliant means projects through the hull of the vessel into the water. As the vessel moves, the strut is deflected by an amount that is proportional to its speed. In another device, a vessel's speed is determined by measuring the pressure generated at the orifice of a Pitot tube mounted upon the hull of the vessel. Still another device uses a propeller that rotates in the water at a rate determined by the vessel's speed.

In each of the above devices, it is required that a member project into the water. This member is prone to damage by corrosion, abrasion by particles in the water, destruction by coming into contact with floating debris or driftwood, and alteration in its contour through the accumulation of marine growth. Each of these impairs the performance of the device.

The use of projections can be avoided by an arrangement for inducing an electric current in the water by an alternating magnetic field produced by a first magnetic circuit. The current produces a voltage in a second magnetic circuit arranged so that the voltage is proportional to the speed of the vessel. The principles of operation are similar to those of an induction generator used to measure the speed of a shaft in a servomechanism. Although projections into the water are avoided, the accuracy of the arrangement is dependent upon the electrical conductivity of the water. Since this varies with water temperature and salinity, it is not as accurate as is desired.

It is an object of the present invention to provide improved means for determining the speed of a vessel travelling through water.

It is a further object to provide an electromagnetic system that includes a sensor unit which has no moving parts for accurately measuring the speed of a vessel travelling through water.

It is another object to provide means for determining the speed of a vessel travelling through water wherein none of the parts of a sensor unit therefor protrude beyond the hull of the vessel.

Still another object is to provide such a means whose accuracy is unaffected by the temperature or salinity of the water through which the vessel is moving.

It is still a further object to provide a marine speedometer having a sensor unit that is rugged and reliable.

The foregoing and other objects and advantages of this invention, which will become more apparent from the drawings and the detailed description below, are attained by means including a sensor unit that comprises a magnet and at least two metal electrodes. These are mounted upon the hull of the vessel whose speed is to be determined. The electrodes are exposed to the water, the magnetic field produced by the magnet passing into the water in the vicinity of the electrodes. A measuring circuit is provided for measuring the voltage generated between the electrodes as the vessel travels through the water.

Referring now to the drawings.

Figure 1:
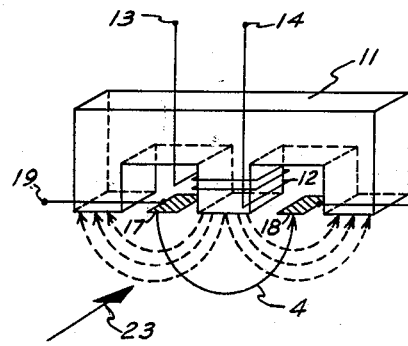
FIG. 1 is a perspective view of a first embodiment of a sensor unit in accordance with the present invention.

Referring to FIG. 1, 11 is an E-shaped core of magnetic material that is energized by a winding 12 carried by the center leg of the core. The ends of the winding are connected to a pair of terminals 13 and 14 which are excited with either an alternating current or a direct current voltage.

A pair of non-magnetic metal electrodes 17 and 18 are supported between the center pole and the outer poles, respectively, of the E-shaped core 11. A pair of output terminals 19 and 20 are connected to electrodes 17 and 18, respectively.

The sensor unit shown in FIG. 1 is to be mounted upon the hull of a vessel, not shown, so that the bottom surfaces of electrodes 17 and 18 are exposed to the water through which the vessel travels. The core 11 should be located within the vessel so that the magnetic field produced between the poles of the core extends into the water. Several lines of magnetic force that are produced in the gap between the poles are indicated in FIG. 1 by the dashed lines terminating at the pole faces of core 11. The direction of the motion of the sensor unit relative to the water is indicated by the arrow 23 perpendicular to the unit.

As the sensor unit moves relative to the water in the direction of arrow 23, the water becomes a moving conductor in the magnetic field of core 11. Actually, it behaves like a rotating disc in a homopolar generator. Since the water contacts electrodes 17 and 18 a potential E is generated between the electrodes, following the laws of magnetic induction. One of the electric lines of force that is induced between electrodes 17 and 18 is indicated by line 4, which intersects the magnetic lines of force at right angles. The potential $E = BWS \times 10^{-8}$ volts, where:

E is the generated potential in volts,

B is the strength of the magnetic field in gausses,

W is the mean length of the desired path of voltage generation between electrodes 17 and 18 in centimeters, and S is the rate of flow of the water in centimeters per second relative to the vessel.

The desired path of voltage generation is the path which threads the maximum flux and is everywhere at right angles to this flux and at right angles to the direction of motion. These paths are shunted, however, by a plurality of undesired conductive paths which are threaded by magnetic flux which differs from that which threads the desired path of voltage.

These undesired paths act as resistive shunts across the generator and tend to reduce the measured voltage from the simple relationship above. In an equivalent circuit of the generator having an internal resistance $R_g$ shunted by a resistance $R_{sh}$, the net voltage $E_m$ that actually is measured will be $$E_m = E_0\left(\frac{R_{sh}}{R_{sh}+R_g}\right)$$

where:

$E_0$ is the voltage which would be measured in the absence of shunting circuits, $R_g$ is the internal resistance of the generator, and $R_{sh}$ is the effective shunt resistance of the undesired conductive paths.

The generator resistance $R_g$ and the shunting resistance $R_{sh}$ are related to water conductively by geometrical constants $R_g = rK_g$ and $R_{sh} = rK_{sh}$, where $r$ is the specific resistivity of the water and $K_g$ and $K_{sh}$ are related to the geometry of the sensor unit. Therefore, $$E_m = E_0\left(\frac{K_{sh}}{K_{sh}+K_g}\right)$$

the term involving water resistivity being cancelled out. Thus, the measured voltage $E_m$ does not change with variations in water salinity and temperature.

Figure 2:
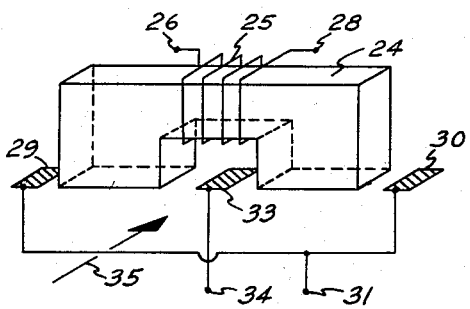
FIG. 2 is a perspective view of an alternative embodiment of the sensor unit.

An alternative form of a sensor unit is shown in FIG. 2, where a magnetic core 24 has a U-shaped configuration. The core is energized by a winding 25 whose ends are connected to a pair of terminals 26 and 28, respectively, for receiving either an alternating current or a direct current voltage. Again, the core would be supported within the vessel so that the magnetic field between its two poles extends into the water as described above with respect to FIG. 1.

Two non-magnetic metal electrodes 29 and 30 flank the magnetic gap between the poles of the core, and should be supported so that their bottom surfaces are exposed to the water. Both electrodes are connected to a common output terminal 31. A non-magnetic metal electrode 33 is supported between the poles of the core and is connected to an output terminal 34. The bottom surface of electrode 33 also should be exposed to the water. The forward motion of the sensor unit relative to the water is indicated by arrow 35, at right angles with the sensor unit.

As the surfaces of the electroeds 29, 30 and 33 and the magnetic field produced by the sensor unit pass through the water, a voltage is generated between the terminals 31 and 34. This voltage is proportional to the rate of flow of the water relative to the sensor unit along the arrow 35.

In the unit shown in FIG. 2, the electrodes 29 and 30 may comprise a fairing plate of conducting material surrounding the sensor unit and connected to, or forming a part of the hull of the vessel. The electrode 33 may be connected to terminal 34 by the inner conductor of a coaxial shielded lead, not shown, the outer conductor of such a lead being connected to a metal fairing plate for the vessel or another suitable grounding point. This embodiment of the sensor unit is particularly useful with vessels having metal hulls because it is convenient to use the hull as electrodes 29 and 30. The electrode 33 then would be mounted upon the hull in insulated relationship therewith.

One of the most important features of the sensor units shown in FIGS. 1 and 2 is that none of its parts are required to protrude into the water beyond the hull line of the vessel. Therefore, the unit is not subject to damage in the water. Furthermore, as long as the meter used for measuring the generated voltage has a resistance which is high compared with the resistance of the sensor unit, the conductivity of the water is immaterial, provided the meter used for measuring the voltage has resistance which is high compared with the resistance of the sensor unit. Vacuum tube volt meters such as the Hewlett-Packard models 425A and 400D for direct and alternating current voltage measurements, respectively, have input resistances of at least one megohm and are suitable for making this measurement. This will not be affected by changes in the salinity or the temperature of the water, so long as it has reasonable conductivity such as is found in harbors, rivers and lakes throughout the world.

It has been assumed in the above description that either a unidirectional or alternating voltage is applied to the input terminals of the sensor unit. However, galvanic voltages are developed between the electrodes of the sensor unit because of electrolysis. These galvanic voltages are essentially D.-C. voltages that fluctuate over a period of time and add or subtract from the voltage generated between the output terminals of the sensor unit. Therefore, in order to separate the undesired D.-C. voltages produced by the spurious galvanic effects, it is preferable to use an alternating current voltage source and alternating current metering means to measure the generated voltage.

Figure 3:
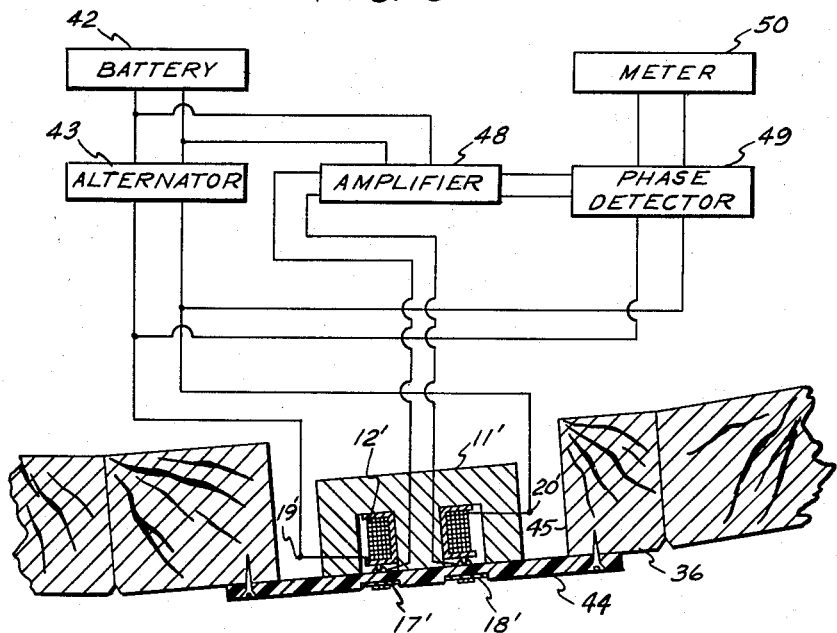
FIG. 3 is a schematic diagram of a circuit for measuring the voltage generated between the metal electrodes of one embodiment of the sensor unit, shown mounted upon the hull of a vessel.

Referring to FIG. 3, a sensor unit similar to that shown in FIG. 1 and comprising an E-shaped magnetic core 11', a winding 12', and a pair of electrodes 17' and 18' is shown mounted upon a water tight plate 44, which seals a hole 45 provided in one of the bottom strakes 36 of the hull of the vessel for receiving the sensor unit. The strakes are illustrated as being of non-conductive material such as wood, although the hull could be of metal. The plate 44 is of non-conducting, non-magnetic material such as "Fiberglas," for example, and may be recessed in the strake 45 if desired to avoid any protrusion beyond the hull line of the vessel.

The two electrodes 17' and 18' are recessed in plate 44 with their bottom surfaces exposed to the water supporting the vessel. Water tight bolts and nuts, for example, are used to fasten the electrodes to plate 44. The effective plane of the magnetic flux gap between the poles of the sensor unit lies in the plane of the drawing and is transverse the longitudinal axis of the vessel.

The input terminals 19' and 20' of winding 12' are excited by an alternating voltage produced by a battery 42 and an alternator 43. The alternator 43 is any suitable device for converting the D.-C. power of battery 42 into an A.-C. voltage. This A.-C. voltage might be a twelve volt peak to peak square wave, for example. The winding 12' produces a magnetic field that has a flux density of 200–400 gausses, for example.

The electrodes 17' and 18' are connected to the input terminals of an alternating current amplifier 48, which receives its power from the battery 42. This amplifier is preferably of a type which includes a band pass filter circuit for amplifying signals only at the frequency of the alternating voltage supplied to the winding 12'.

The output of the amplifier 48 is supplied to a phase detector 49, which may be of the type described on pages 483 and 485 of "Electron Tube Circuits" first edition by Samuel Seely and published by the McGraw-Hill Book Company, Inc. in 1950, for example. The device 49 also may be referred to as a synchronous detector. Similar devices using semiconductor diodes and transistors also may be employed.

A reference signal for the phase detector 49 is obtained from the output of the alternator 43. The phase detector is sensitive only to signals of the same frequency as that of the reference signal, all other signals being rejected. The output of the phase detector 49 is a direct current voltage which is supplied to a direct current meter 50 for measuring the magnitude of the voltage generated between electrodes 17' and 18'.

In operation of the arrangement shown in FIG. 3, an alternating magnetic field is produced in the flux gap between the poles of the E-shaped core element 11'. This field passes into the water supporting vessel. As the vessel moves relative to the water in a direction perpendicular to the plane of the drawing, the magnetic field induces electric lines of force between electrodes 17' and 18', whose bottom surfaces are exposed to the water. The potential difference between electrodes 17' and 18' is proportional to the rate at which the magnetic field passes through the water, which is equal to the speed of the vessel relative to the water.

The voltage generated between the electrodes 17' and 18' is a very small alternating voltage, being of the order of one millivolt or less. It contains a direct current component of unpredictable magnitude and polarity in accordance with the galvanic condition of the electrodes.

However, the undesired direct current component and any other spurious components of the alternating voltage between electrodes 17' and 18' are removed by amplifier 48 and phase detector 49 to produce a D.-C. voltage whose magnitude is accurately related to the speed of the vessel. The meter 50 measures this voltage, and is provided with a visual indicator, not shown, for indicating the speed of the vessel in accordance with the voltage measured thereby.

Since changes could be made both in the illustrated embodiments of the invention and the above description, and different words of description could be used without departing from the scope and spirit of the invention, it is to be understood that the invention is limited solely by the appended claims.

What is claimed is:

1. A sensor device for determining the speed of a vessel travelling through water by producing a voltage that is proportional to the rate of flow of water relative to the vessel comprising a C-shaped core of magnetic material having a pair of poles which have pole faces that face in the same direction, a winding supported by said core for producing a magnetic field between said poles, first electrode means between said pole faces, second electrode means on the opposite sides of the space between said pole faces, respectively, means for insulating said first and second electrode means from each other, and means for attaching said sensor device to said vessel so that said pole faces and said electrodes are substantially flush with an outer surface of said vessel.

2. A sensor device for determining the speed of a vessel travelling through water comprising a magnet having two pole faces only that substantially face in the same direction and substantially lie in the same plane, first electrode means lying between said pole faces substantially in the plane of said poles, further electrode means having first and second electrically connected parts located on opposite sides of the space between said pole faces respectively, said parts substantially lying in the plane of said pole faces, means for connecting a first output terminal to said first electrode means, means for connecting a second output terminal to said further electrode means, and means for attaching the sensor device to said vessel so that said pole faces and said electrodes are substantially flush with an outer surface of said vessel.

3. The sensor device set forth in claim 2, wherein said magnet is an electromagnet having a C-shaped core, the ends of said core forming said pole faces.

4. A sensor device set forth in claim 3, wherein said further electrode means comprises a fairing plate of electrically conductive material.

5. The sensor device set forth in claim 3, wherein said further electrode means comprise part of the hull of said vessel.

References Cited in the file of this patent

UNITED STATES PATENTS

| | | |
|---|---|---|
| 2,149,847 | Kolin | Mar. 7, 1939 |
| 2,733,604 | Coulter | Feb. 7, 1956 |
| 2,887,878 | Kamp et al. | May 26, 1959 |
| 2,893,243 | Hurley | July 7, 1959 |
| 2,969,673 | Snyder et al. | Jan. 31, 1961 |

OTHER REFERENCES

The Measurement of Sea-Water Velocities by Electromagnetic Induction, Guelke et al., The Journal of the Institution of Electrical Engineers, vol. 94, parts 243, pub. date 1947, pages 71–74.